United States Patent
Ting

(10) Patent No.: US 8,416,348 B2
(45) Date of Patent: Apr. 9, 2013

(54) DIGITAL TV AND METHOD FOR PROCESSING DATA SIGNAL IN DIGITAL TV

(75) Inventor: Hung-Kai Ting, Taoyuan County (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1062 days.

(21) Appl. No.: 12/248,134

(22) Filed: Oct. 9, 2008

(65) Prior Publication Data

US 2009/0102977 A1 Apr. 23, 2009

(30) Foreign Application Priority Data

Oct. 19, 2007 (TW) ................................ 96139284 A

(51) Int. Cl.
*H04N 9/64* (2006.01)
*H04N 7/12* (2006.01)

(52) U.S. Cl.
USPC ........... 348/720; 348/715; 348/721; 348/719; 348/567; 345/544

(58) Field of Classification Search .................. 348/720, 348/721, 719, 716, 715, 567; 725/89, 134; 712/14, 32, 35; 345/547, 544; 375/240.01
See application file for complete search history.

(56) References Cited

U.S. PATENT DOCUMENTS

| | | | | |
|---|---|---|---|---|
| 5,521,979 A | * | 5/1996 | Deiss | 380/212 |
| 2003/0189957 A1 | * | 10/2003 | Misu et al. | 370/536 |
| 2006/0200846 A1 | * | 9/2006 | Phan | 725/89 |

* cited by examiner

*Primary Examiner* — Jefferey Harold
*Assistant Examiner* — Jean W Desir
(74) *Attorney, Agent, or Firm* — WPAT PC; Justin King

(57) ABSTRACT

The present invention provides a digital TV. The digital TV comprises a memory, a signal processing module, and a processor. The memory is for storing a regular program code. The signal processing module is for receiving and processing a data signal, and for generating an interruption signal. The processor coupled to the memory and the signal processing module is for receiving the interruption signal and reading the regular program code from the memory, and for executing the regular program code to realize functions of the digital TV. The memory is divided into a plurality of blocks, and the processor accesses the memory by block. Each block includes a first sub-block storing a specific program code. When the processor receives the interruption signal, the processor reads the specific program code of the first sub-block of the currently-accessed block and executes the specific program code.

18 Claims, 6 Drawing Sheets

DIGITAL TV AND METHOD FOR PROCESSING DATA SIGNAL IN DIGITAL TV

BACKGROUND OF INVENTION

1. Field of the Invention

The present invention relates to a digital TV and a method for processing a data signal in a digital TV, especially to a digital TV and a method for processing a data signal in a digital TV, in which a memory is divided into a plurality of blocks and a processor accesses the memory by block.

2. Description of the Prior Art

At present, the digital TV market is rather fast-growing, such that many companies invest great measures of manpower and material resources in developing and producing digital TV products. Compared with the conventional analog TV, the digital TV has more complex functions and requires processing of a larger amount of data, so more powerful operating units are necessary for the implementation of the functions of the digital TV. On the contrary, operating units for the analog TV are quite simple. Now, during the transition period from the analog TV to the digital TV, many R&D people of system houses are still using development equipments widely used in the analog TV field, such as a program compiler. Moreover, the R&D people are also more familiar with interfaces and systems of the analog TV. However, when it comes to the digital TV, because of the differences between operating units of the analog and digital TVs, not only the development equipments need to be modified, but also the R&D people have to adapt to new systems and interfaces. Therefore, the cost in development is increased and time-to-market is delayed.

SUMMARY OF INVENTION

It is therefore a primary objective of the claimed invention to provide a digital TV and a method for processing a data signal in a digital TV, so as to solve the above problems.

According to an embodiment of the claimed invention, a digital TV is disclosed. The digital TV comprises a memory, a signal processing module, and a processor. The memory is for storing a regular program code. The signal processing module is for receiving and processing a data signal, and for generating an interruption signal. The processor coupled to the memory and the signal processing module is for receiving the interruption signal and reading the regular program code from the memory, and for executing the regular program code to perform functions of the digital TV. The memory is divided into a plurality of blocks, and the processor accesses the memory by block. Each block includes a first sub-block storing a specific program code. When the processor receives the interruption signal, the processor reads the specific program code of the first sub-block of the currently-accessed block and executes the specific program code.

According to another embodiment of the claimed invention, a method for processing a data signal in a digital TV is disclosed. The method comprises: (a) providing a memory, the memory being divided into a plurality of blocks, and each block including a first sub-block; (b) storing a regular program code into the memory; (c) storing a specific program code into each first sub-block; (d) receiving and processing a data signal, wherein when the processed data amount of the data signal reaches a predetermined amount, an interruption signal is generated accordingly; (e) accessing the memory by block to read the regular program code from the memory and executing the regular program code to realize functions of the digital TV; and (f) reading the specific program code of the first sub-block of the currently-accessed block when the interruption signal is generated, and executing the specific program code.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
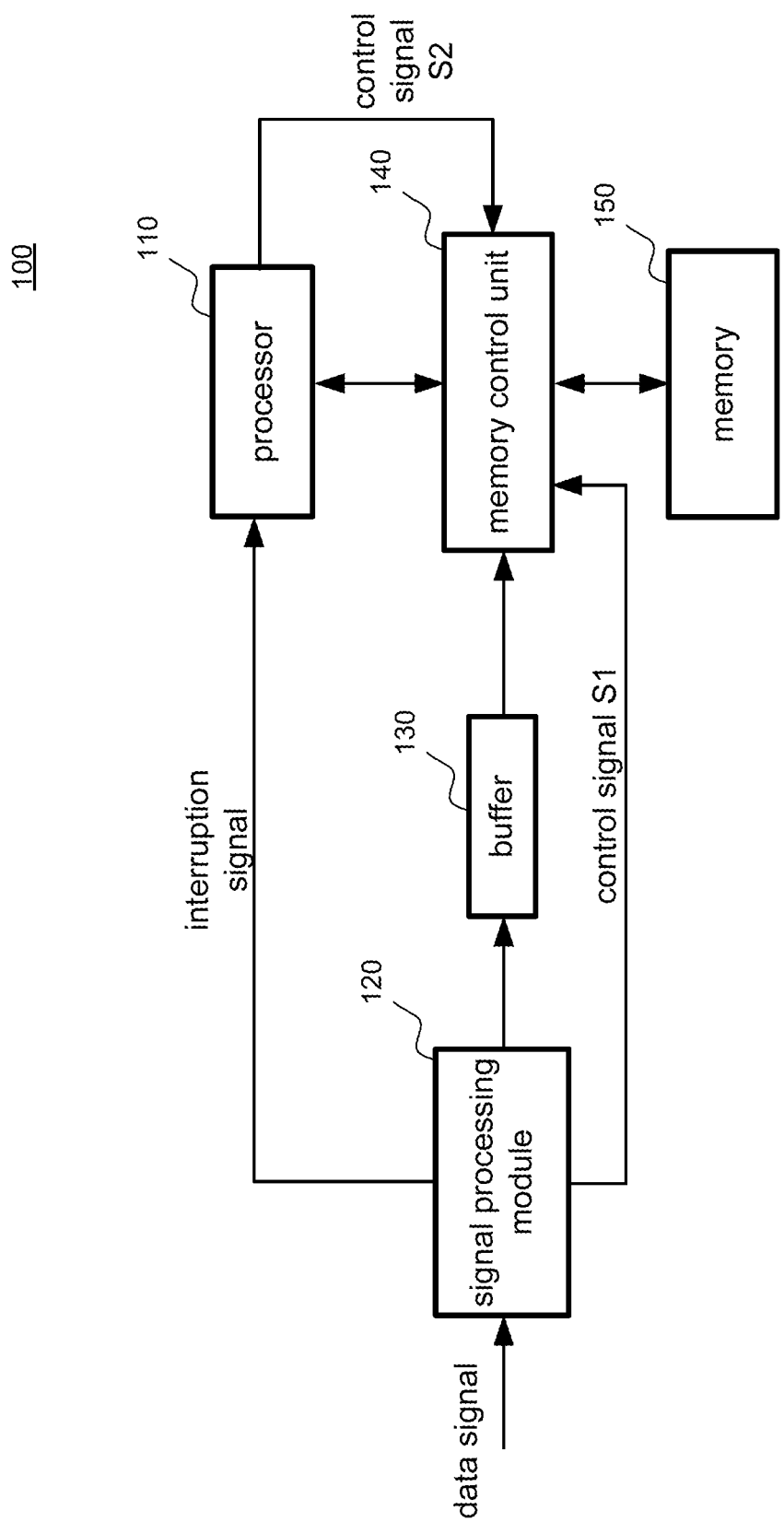
FIG. 1 is a partial circuit diagram of a digital TV according to an embodiment of the claimed invention.

FIG. 1 shows a partial circuit diagram of a digital TV according to an embodiment of the claimed invention. The implementation of partial functions of the digital TV by utilizing a simplified processor will be exemplified by the partial circuit shown and the functions performed by the partial circuit. As shown in FIG. 1, a partial circuit 100 of the digital TV comprises a processor 110, a signal processing module 120, a buffer 130, a memory control unit 140, and a memory 150. The signal processing module 120 is for receiving and processing a data signal, and for generating an interruption signal according to a processing result of the data signal. In the present embodiment, examples of the signal processing module 120 include a transport stream processor module (TSP module), which receives and processes the data signal containing service information (SI) for the digital TV such as the digital video broadcasting (DVB) system, while the SI, for example, contains an electric program guide (EPG) for the digital TV.

When processing the SI, the TSP module executes packet identification (PID) filtering and section filtering. The filtered packet data is stored into the buffer 130. When the data amount of the packet data stored in the buffer 130 reaches a predetermined value, the signal processing module 120, namely, the TSP module in the present embodiment, generates a control signal S1 to the memory control unit 140. Under control of the control signal S1, the memory control unit 140 reads the packet data from the buffer 130 and stores the packet data into the memory 150 to generate filtered SI. Moreover, when the data amount of the SI processed by the TSP module reaches a predetermined value, e.g., a minimum unit of the SI, namely a section, the TSP module generates an interruption signal to the processor 110.

Figure 2:
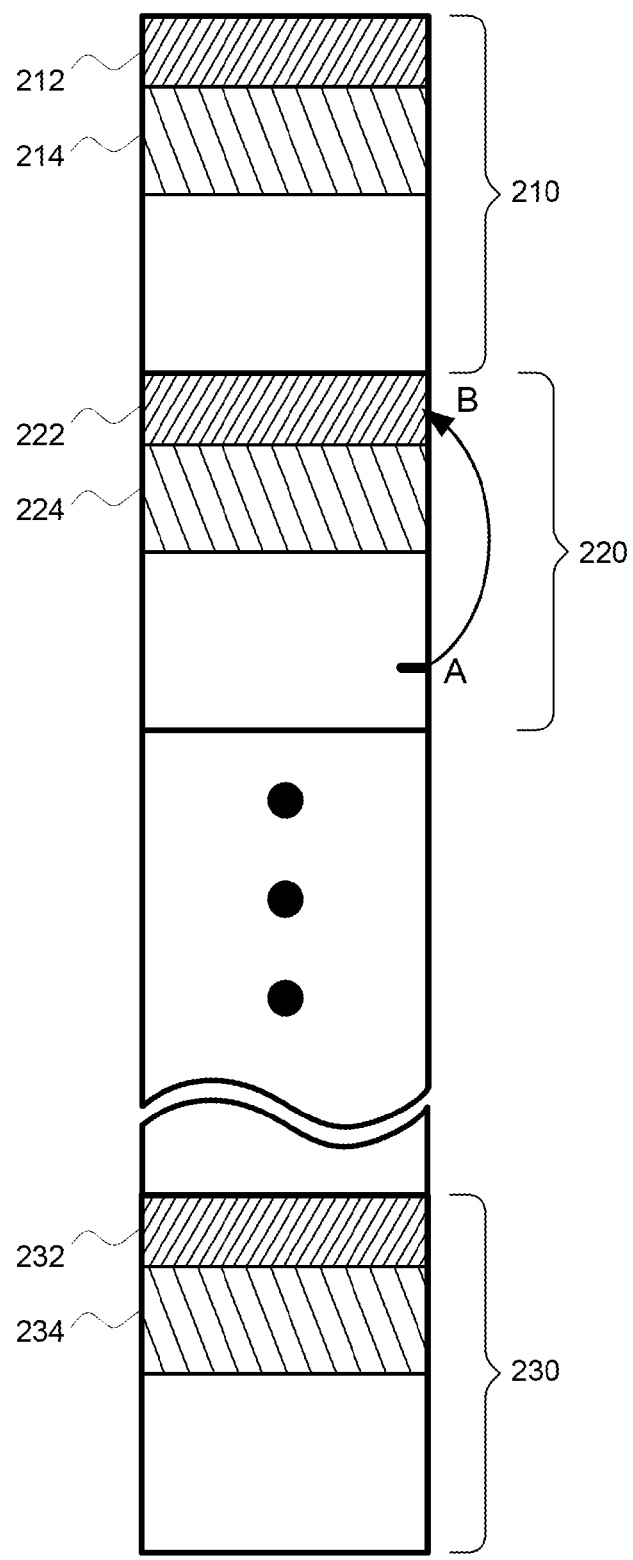
FIG. 2 is a diagram of the arrangement for the memory and reading the specific program code according to the claimed invention.

The processor 110 is coupled to the signal processing module 120 and the memory control unit 140. The processor 110 accesses the memory 150 to read or write a program code or data via the memory control unit 140. The memory 150 stores a regular program code, and the processor 110 executes the regular program code to realize functions of the digital TV, such as generating an on screen display (OSD) menu, video and audio decoding, image interpolation and scaling, SI decoding, etc. According to a preferred embodiment of the present invention, examples of the processor 110 include the single-chip processor developed by Intel corp. in 1981, such as an 8-bit single-chip processor. In the present invention, the processor 110 accesses the memory 150 by block. When a block becomes the target block to be accessed, the processor 110 accesses the data contained within the target block; when the processor 110 needs to access data outside the target block, the processor has to change to the next target block determined in a manner to be described below. That is, the memory 150 is divided into a plurality of blocks. As shown in FIG. 2, a portion used for storing the regular program code in the memory 150 is divided into a plurality of blocks 210, 220, and 230. Moreover, each block includes two sub-blocks. To be exact, the block 210 includes a first sub-block 212 and a second sub-block 214, the block 220 includes a first sub-block 222 and a second sub-block 224, and the block 230 includes a first sub-block 232 and a second sub-block 234. Note that the relative location of each first sub-block in its corresponding block is the same, and the relative location of each second sub-block in its corresponding block is the same. For example, in the blocks 210, 220, and 230, each of the first sub-blocks 212, 222, and 232 is located at the uppermost part of the corresponding block, and the second sub-blocks 214, 224, and 234 are placed next to the first sub-blocks 212, 222, and 232 respectively. Examples of the arrangement of the first and second sub-blocks include those shown in FIG. 3 and FIG. 4.

Each first sub-block stores a specific program code. When the processor 110 receives the interruption signal sent from the signal processing module 120, the processor 110 controls the memory control unit 140 to read the specific program code from the first sub-block of the block currently being accessed by the processor 110. More specifically, for the arrangement shown in FIG. 2, assuming that the processor 110 is currently reading and executing the regular program code within the part (denoted by the position A) of the block 220 other than the first sub-block 222 and the second sub-block 224 right before receiving the interruption signal, after the processor 110 receives the interruption signal, the processor 110 controls the memory control unit 140 to change to the first sub-block 222 (denoted by the position B) of the block 220 to read the specific program code. When the processor 110 executes the specific program code, the processor 110 sets a flag and generates a control signal S2 to control the memory control unit 140 according to the setting of the flag.

The memory control unit 140 is coupled to the processor 110, the buffer 130, and the memory 150. When the memory control unit 140 receives the control signal S2 from the processor 110, the memory control unit 140 reads from the memory 150 the filtered SI composed of the packet data, and sends the filtered SI to the processor 110. Then, the processor 110 executes the regular program code to parse the filtered SI. The parsed SI is then stored into the memory 150 through the memory control unit 140. Alternatively, the parsed SI can be stored into an external memory (not shown) via other devices, such as an inter-integrated circuit ($I^2C$).

In the memory 150, the second sub-block of each block stores a connecting program code. When the processor 110 needs to execute a regular program code stored in a block which is not currently accessed, the processor 110 shall read via the memory control unit 140 the connecting program code stored in the second sub-block of the currently-accessed block to determine the next target block to be accessed. For example, with reference to FIG. 5, assuming that the block currently being accessed by the processor 110 is the block 220, when the process of executing the regular program code within the part (denoted by the position C) of the block 220 other than the first and second sub-blocks finishes, and the processor 110 needs to execute a regular program code in a block other than the block 220, the processor 110 shall read via the memory control unit 140 the connecting program code in the second sub-block 224 (denoted by the position D) to determine the next target block. Assuming that the next target block is the block 210, the processor 110 reads first the connecting program code in the second sub-block 214 (denoted by the position E) of the block 210 via the memory control unit 140 to determine an initial reading point within the part (denoted by the position F) of the block 210 other than the first sub-block 212 and the second sub-block 214.

Figure 3:
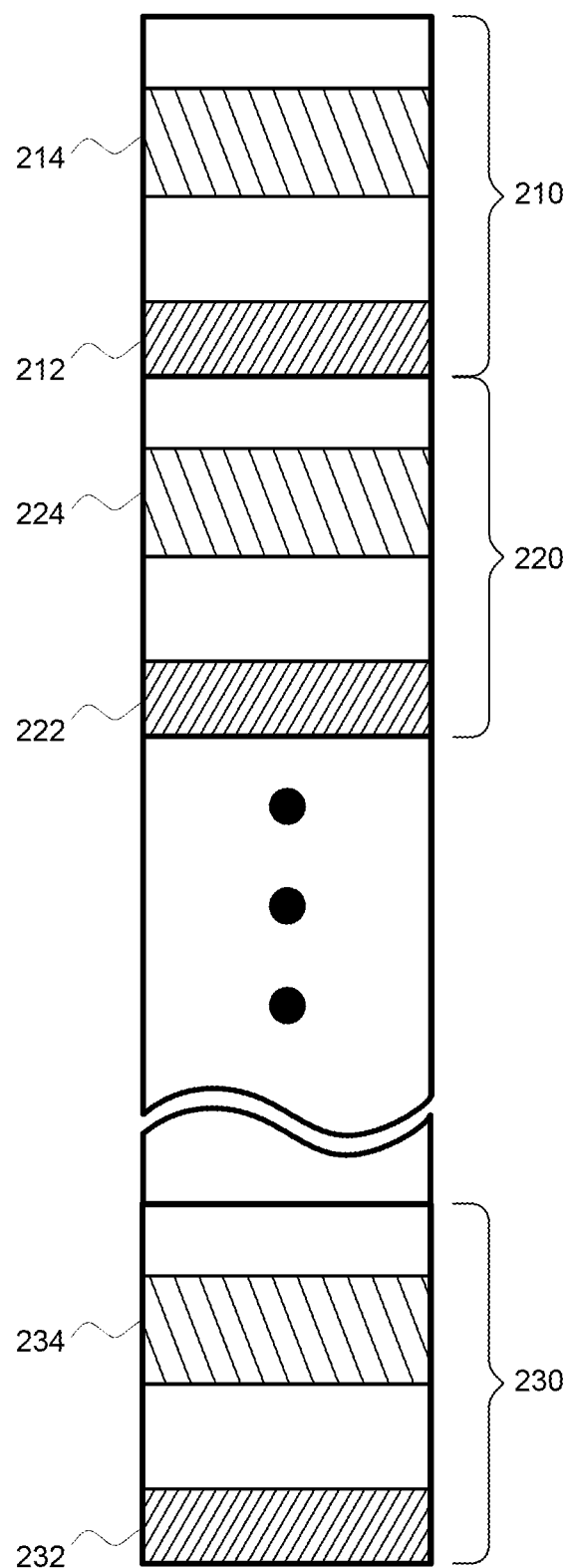
FIG. 3 is a diagram of the arrangement for the memory according to the claimed invention.
Figure 4:
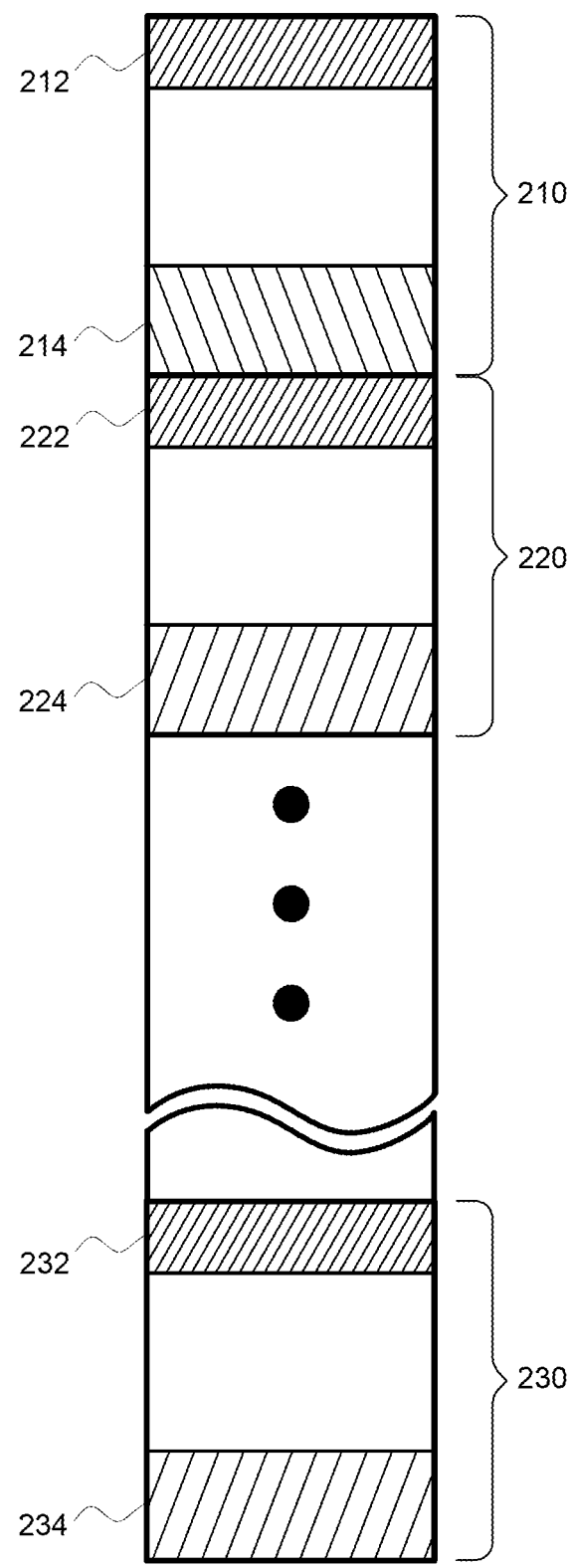
FIG. 4 is a diagram of the arrangement for the memory according to the claimed invention.
Figure 6:
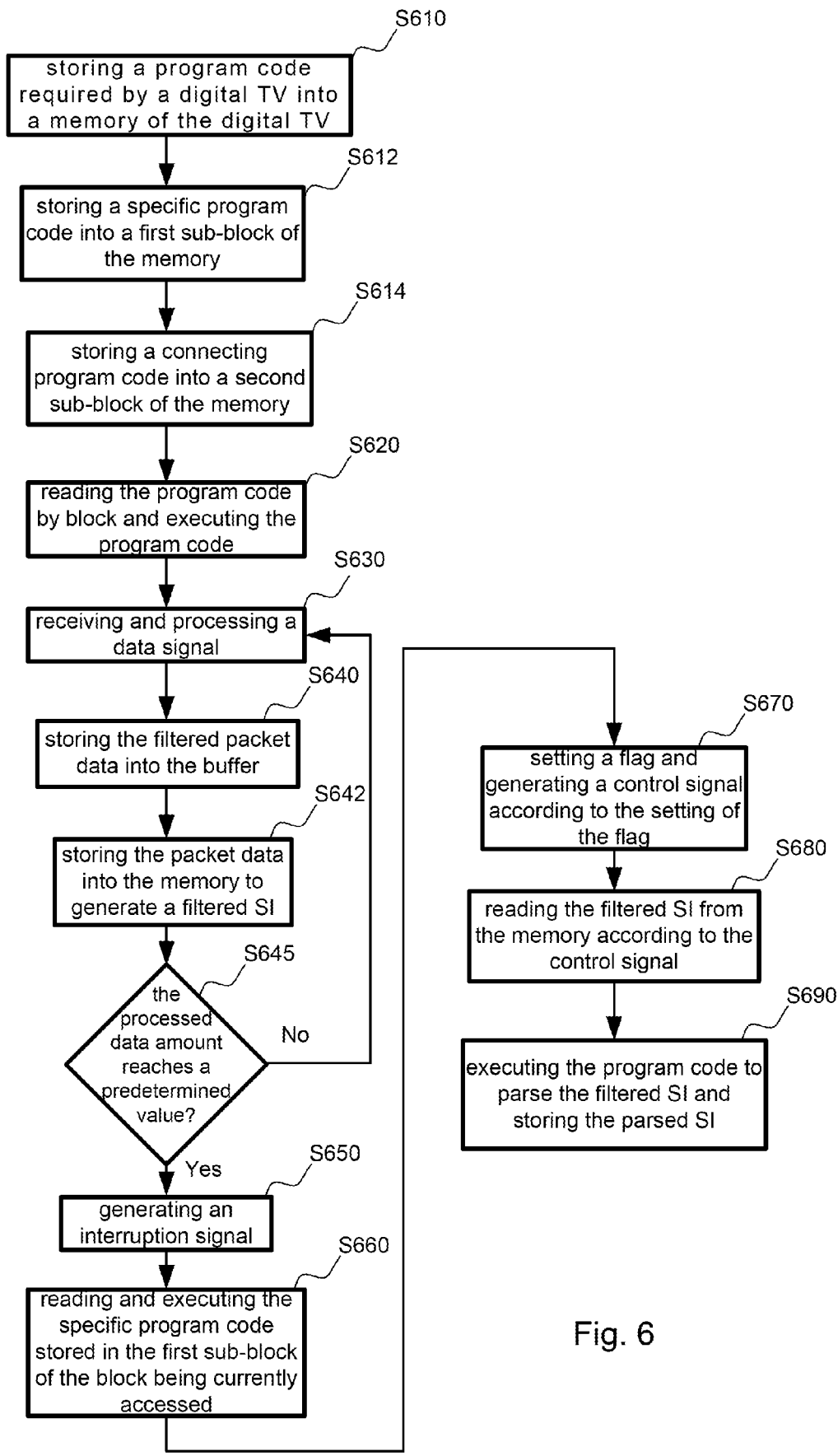
FIG. 6 is a flowchart of the method for processing a data signal in a digital TV according to an embodiment of the claimed invention.

FIG. 6 shows a flowchart of a method for processing a data signal in a digital TV according to an embodiment of the claimed invention. First, a step (S610) of storing a regular program code required by a digital TV into a memory of the digital TV is processed. Referring to FIGS. 2-4, in the digital TV according to the present invention, the memory is divided into a plurality of blocks, and is accessed by block. When a block becomes the target block to be accessed, data contained within the target block are accessed; and when there is a need to access data not contained in this block, the target block has to be changed. In addition, each block includes a first sub-block and a second sub-block. Note that the relative location of each first sub-block in its corresponding block is the same, and the relative location of each second sub-block in its corresponding block is the same. Next, a step (S612) of storing a specific program code into a first sub-block of the memory, and a step (S614) of storing a connecting program code into a second sub-block of the memory are processed. The program codes are read by block and executed to realize functions of the digital TV (S620). The functions may include generating an on screen display (OSD) menu, video and audio decoding, image interpolation and scaling, SI decoding, etc.

Then, a step (S630) of receiving and processing a data signal is processed. In the DVB system, the data signal may contain service information (SI) for the digital TV, and the SI may contain an electric program guide (EPG) for the digital TV. The processing procedures, for example, include packet identification (PID) filtering and section filtering. The filtered packet data is stored into the buffer (S640). When the data amount of the packet data stored in the buffer reaches a predetermined value, the packet data shall be stored into the memory to generate filtered SI (S642).

Next, a step (S645) of determining whether the processed data amount reaches a predetermined value is processed. If not, return to the step S630; if yes, an interruption signal is generated (S650). According to the interruption signal, the processor of the digital TV accesses the memory to read the specific program code stored in the first sub-block of the currently-accessed block, and then to execute the specific program code (S660). More specifically, for the block arrangement shown in FIG. 2, assuming that the processor is reading and executing the regular program code within the part (denoted by the position A) of the block 220 other than the first sub-block 222 and the second sub-block 224 right before receiving the interruption signal, after the processor receives the interruption signal, the processor changes to the first sub-block 222 (denoted by the position B) of the block 220 to read and execute the specific program code. Then the processor sets a flag and generates a control signal S2 according to the setting of the flag (S670).

Then, a step (S680) of reading the filtered SI from the memory according to the control signal S2 is performed. Finally, a step (S690) of executing the regular program code to parse the filtered SI and storing the parsed SI is performed.

Figure 5:
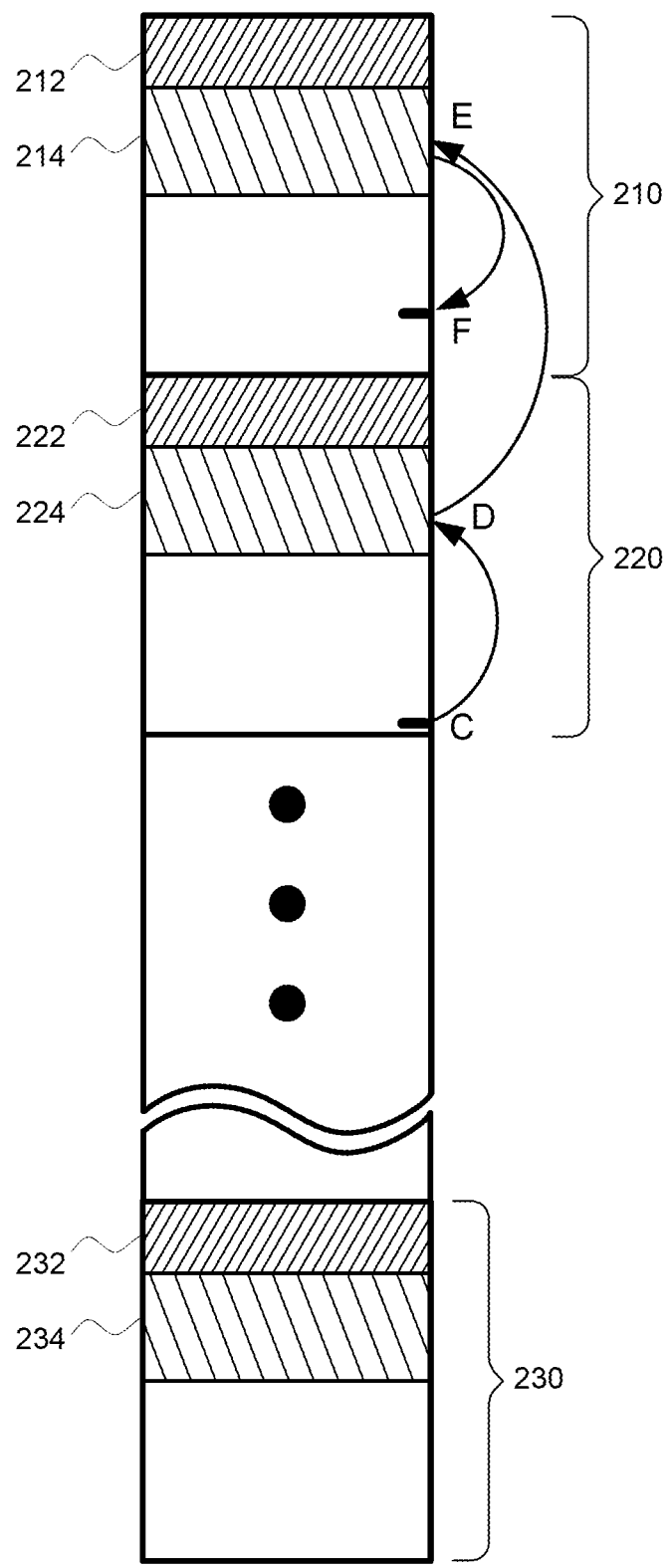
FIG. 5 is a diagram of changing the target block during accessing the memory according to the claimed invention.

Note that in the present invention, the memory is accessed by block to read the regular program code. If the processor needs to read a considerable amount of regular program code to execute a certain function, for example, in the above embodiment, receiving and parsing the SI for the digital TV, the processor usually has to read the regular program code of a data amount greater than the capacity of one block. Therefore, when the processor finishes executing the regular program code of the currently-accessed block, the processor needs to change to the next target block to read more regular program codes. Refer to FIG. 5 for further illustrations on the procedures of switching the target blocks. Assuming that the block currently accessed by the processor 110 is the block 220, when finishing executing the regular program code in the part (denoted by the position C) of the block 220 other than the first and second sub-blocks, the processor 110 shall read the connecting program code in the second sub-block 224 (denoted by the position D) to determine the next target block. Assuming that the next target block is the block 210, the processor 110 reads first the connecting program code in the second sub-block 214 (denoted by the position E) of the block 210 to determine an initial reading point within the part (denoted by the position F) of the block 210 other than the first sub-block 212 and the second sub-block 214. Moreover, the above procedures of switching the target blocks can occur at any step shown in the flowchart of FIG. 6. As long as the processor finishes executing all the regular program code of the currently-accessed block and the process of parsing the SI is not complete, the processor has to switch the target block to read more regular program codes.

The present invention utilizes a simplified processor to realize functions of the digital TV. Although in the embodiment according to the present invention, an example of accessing the memory by the processor is illustrated only by describing the processing of the SI for the digital TV, the functions the simplified processor is capable of performing are not limited to the above embodiment. The practical implementation proves that the simplified processor can perform other functions realized by complex processors of the conventional digital TV. That is, utilizing the simplified processor according to the present invention can reduce the manufacturing cost and still realizes regular functions that a digital TV is supposed to have. In addition, the R&D people of the system houses do not have to update the development equipments and adapt to new system circumstances and interfaces, so that the manufacturing process is speeded up.

Those skilled in the art will readily observe that numerous modifications and alterations of the device and method may be made while retaining the teachings of the invention. Accordingly, the above disclosure should be construed as limited only the metes and bounds of the appended claims.

What is claimed is:

1. A digital TV, comprising:
a memory, for storing a regular program code;
a signal processing module, for receiving and processing a data signal and generating an interruption signal, and
a processor coupled to the memory and the signal processing module, for receiving the interruption signal and reading the regular program code from the memory, and for executing the regular program code;
wherein, the memory is divided into a plurality of blocks, and the processor accesses the memory by block; each of the plurality of blocks comprises a first sub-block storing a specific program code, and when the processor receives the interruption signal, the processor reads the specific program code from the first sub-block of the currently-accessed block and executes the specific program code;
wherein each of the plurality of blocks further comprises a second sub-block having a connecting program code, when the processor executes program codes of a non-currently accessed block, the processor reads connecting program code in the second sub-block to decide a next target block to access;
wherein each of the plurality of blocks further comprises a third sub-block having a regular program code stored by section, the processor accesses the specific program code and the connecting program code and reads the regular program code by section to realize a function of a digital television.

2. The digital TV of claim 1, wherein the relative location of each first sub-block in its corresponding block is the same.

3. The digital TV of claim 1, wherein the relative location of each second sub-block in its corresponding block is the same.

4. The digital TV of claim 1, wherein when the processor accesses the target block, the processor reads first the connecting program code from the second sub-block of the target block, and then determines an initial reading point of the target block within the part other than the first sub-block and the second sub-block.

5. The digital TV of claim 1, wherein the signal processing module is a transport stream processor module (TSP module), and the data signal contains service information (SI) divided into a plurality of SI packets received from a digital television broadcast signal intended for the digital TV, and when the TSP module assembles the SI packets into service information, the TSP module generates the interruption signal;
wherein the service information is unable to be changed by users of the digital TV.

6. The digital TV of claim 5, further comprising:
a buffer coupled to the TSP module, for storing packet data generated from processing the SI.

7. The digital TV of claim 6, wherein when the processor executes the specific program code, the processor sets a flag and generates a control signal according to the setting of the flag.

8. The digital TV of claim 7, further comprising:
a memory control unit coupled to the processor, the memory, the buffer, and the signal processing module, for reading the packet data from the buffer and storing the packet data into the memory to generate filtered SI, and for reading the filtered SI from the memory according to the control signal.

9. The digital TV of claim 8, wherein the processor executes the regular program code to process the filtered SI, and stores the processed filtered SI into the memory through the memory control unit.

10. A method for processing a data signal in a digital TV, comprising:
- (a) providing a memory, wherein the memory is divided into a plurality of blocks, and each of the plurality of blocks comprises a first sub-block, a second sub-block, and a third sub-block;
- (b) storing a regular program code into the memory;
- (c) storing a specific program code into each of the plurality of first sub-blocks; storing a connecting program code in each of the second sub-blocks; reading the connecting program code in the second sub-block to decide a next target block to access when the executing program codes of a non-currently accessed block; storing a regular program code stored by section in each of the third sub-blocks; accessing the specific program code and the connecting program code; and reading the regular program code by section to realize a function of a digital television;
- (d) receiving and processing a data signal, wherein when a processed data amount of the data signal reaches a predetermined value, an interruption signal is generated accordingly;
- (e) accessing the memory by block to read the regular program code from the memory and executing the regular program code; and
- (f) reading the specific program code from the first sub-block of the currently-accessed block when the interruption signal is generated, and executing the specific program code.

11. The method of claim 10, wherein the relative location of each first sub-block in its corresponding block is the same.

12. The method of claim 10, wherein the relative location of each second sub-block in its corresponding block is the same.

13. The method of claim 10, further comprising:
when accessing the target block, reading first the connecting program code from the second sub-block of the target block; and
determining an initial reading point of the target block within the part other than the first sub-block and the second sub-block.

14. The method of claim 10, wherein the data signal contains service information (SI) divided into a plurality of SI packets received from a digital television broadcast signal intended for the digital TV, generating an interruption signal when SI packet data is assembled into the SI;
wherein the service information is unable to be changed by users of the digital TV.

15. The method of claim 14, further comprising:
providing a buffer for storing the packet data into the buffer; and
storing the packet data from the buffer into the memory to generate filtered SI.

16. The method of claim 15, wherein when executing the specific program code, a flag is set and a control signal is generated according to the setting of the flag.

17. The method of claim 16, further comprising:
reading the filtered SI from the memory according to the control signal.

18. The method of claim 17, further comprising:
executing the regular program code to process the filtered SI; and
storing the processed filtered SI.

* * * * *